United States Patent [19]

Jang

[11] Patent Number: 4,901,544
[45] Date of Patent: Feb. 20, 1990

[54] STEERING WHEEL RELEASING AND ENGAGING MECHANISM

[76] Inventor: Jaw J. Jang, 6 Fl., No. 36-5, Ho Ping Rd., Pan Chiao City, Taipei Hsien, Taiwan

[21] Appl. No.: 362,512
[22] Filed: Jun. 7, 1989
[51] Int. Cl.$^4$ .............................................. E05B 13/10
[52] U.S. Cl. ...................................... 70/218; 70/223; 70/252; 70/386; 74/527; 74/552
[58] Field of Search ........................... 74/552, 527, 71; 70/252, 188, 189, 218, 386, 221–223, 237; 292/252; 280/775

[56] References Cited

U.S. PATENT DOCUMENTS

| | | | |
|---|---|---|---|
| 1,455,941 | 5/1923 | Vanderlip | 70/221 |
| 1,531,325 | 3/1925 | White | 74/527 |
| 4,570,776 | 2/1986 | Iwashita et al. | 74/527 X |
| 4,811,580 | 3/1989 | Jang | 70/189 X |

FOREIGN PATENT DOCUMENTS

| | | | |
|---|---|---|---|
| 0110661 | 8/1980 | Japan | 74/527 |
| 0066052 | 4/1982 | Japan | 70/237 |

Primary Examiner—Lloyd A. Gall
Attorney, Agent, or Firm—Bacon & Thomas

[57] ABSTRACT

A steering shaft assembly being composed of an upper part and a lower part. The lower part is cylindrical in shape and is rotatably received by a cylindrical outer housing with the upper part fixedly secured thereabove on the outer housing. The lower part is integral with a steering shaft. An engaging block assembly is freely rotatable and is longitudinally slidable within the steering shaft assembly between an upper limit position and a lower limit position. The engaging block assembly comprises an engaging block and an actuating block. A number of balls are disposed between the steering shaft assembly and the engaging block assembly as well as between the engaging block and the actuating block for transmitting rotational movement. A steering wheel is fixedly mounted on the engaging block assembly by a lock assembly which further controls releasing and engaging between the engaging block assembly and the steering shaft assembly. The engaging block assembly, and therefore the steering wheel, is unable to drive the lower part when the engaging block assembly is in the upper limit postion, while the engaging block assembly rotates the lower part, and therefore the steering shaft, when the engaging block assembly is in the lower limit position.

2 Claims, 6 Drawing Sheets

STEERING WHEEL RELEASING AND ENGAGING MECHANISM

BACKGROUND OF THE INVENTION

The present invention relates to steering wheel locking mechanisms, and in particular relates to a mechanism for selectively releasing and engaging a steering shaft assembly by operating an actuating block of an engaging block assembly. During releasing or engaging the engaging block assembly with the steering shaft assembly, the engaging block assembly is slidable longitudinally within the steering shaft assembly between an upper limit position and a lower limit position. A lock assembly is releasably secured to the top of the engaging block assembly and moves therewith.

A kind of steering wheel locking mechanism has been disclosed in the application Ser. No. 224,386 filed July 26, 1988 now U.S. Pat. No. 4,811,580 by the same applicant. In the cited application, turning a key moves an annular bolt laterally to confine a longitudinal movement between the steering wheel and the steering shaft so that engagement (disengagement) of the steering wheel with (from) the steering shaft is achieved.

A steering wheel releasing and engaging mechanism according to this invention utilizes a plurality of guiding balls and engaging balls to facilitate the engagement or disengagement of the engaging block assembly and the steering wheel assembly.

SUMMARY OF THE INVENTION

A primary objective of this invention is to provide a steering wheel releasing and engaging mechanism, in which a plurality of guiding balls and engaging balls are utilized to facilitate the engagement or disengagement between the engaging block assembly and the steering wheel assembly thereof.

This and additional objects, if not set forth specifically herein, will be readily apparent to those skilled in the art from the detailed description provided hereinbelow, with appropriate reference to the accompanying drawings.

DETAILED DESCRIPTION OF THE PREFERRED EMBODIMENT

Figure 1:
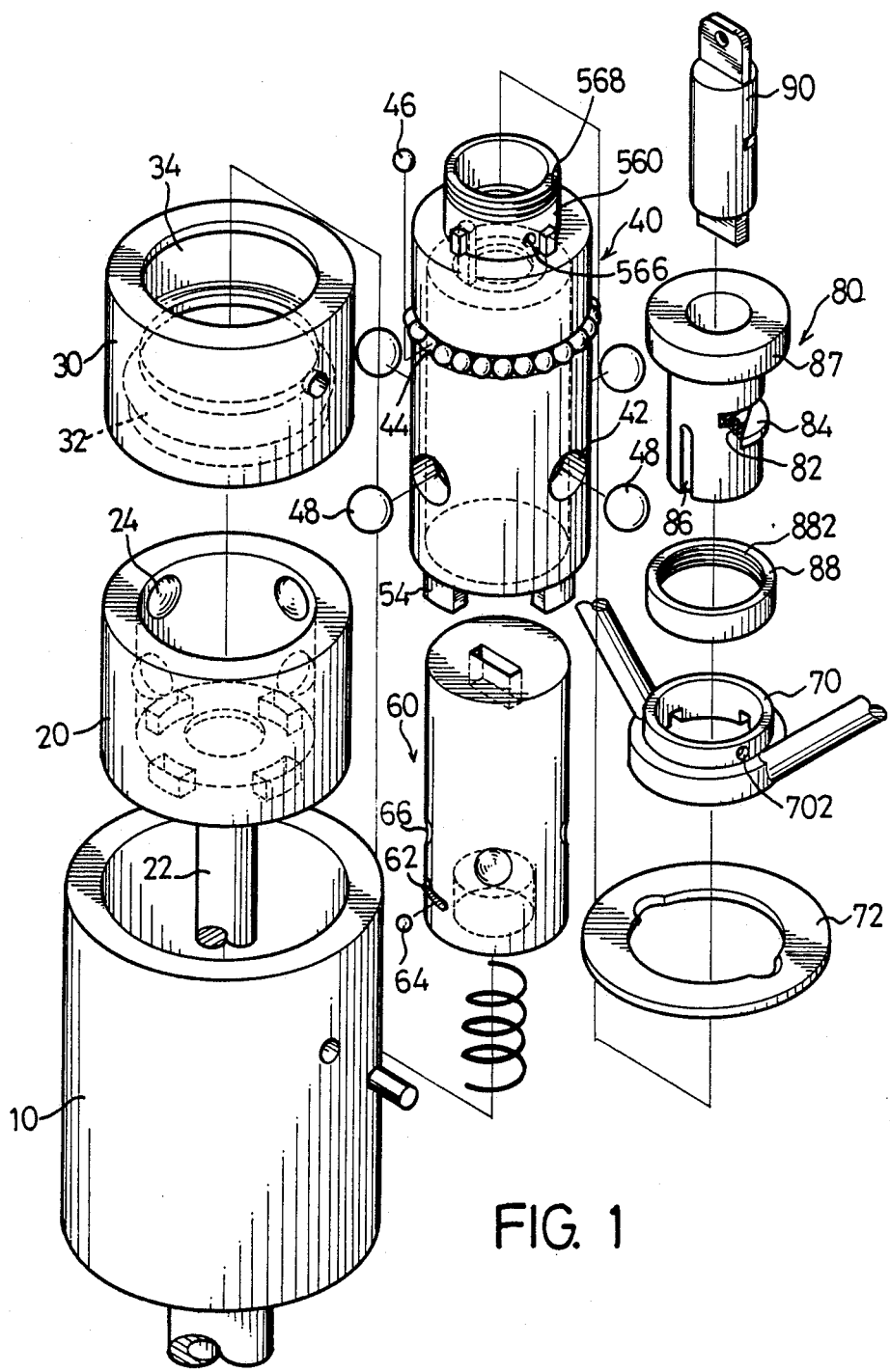
FIG. 1 is an exploded view showing a steering wheel releasing and engaging mechanism in accordance with the present invention.
Figure 2:
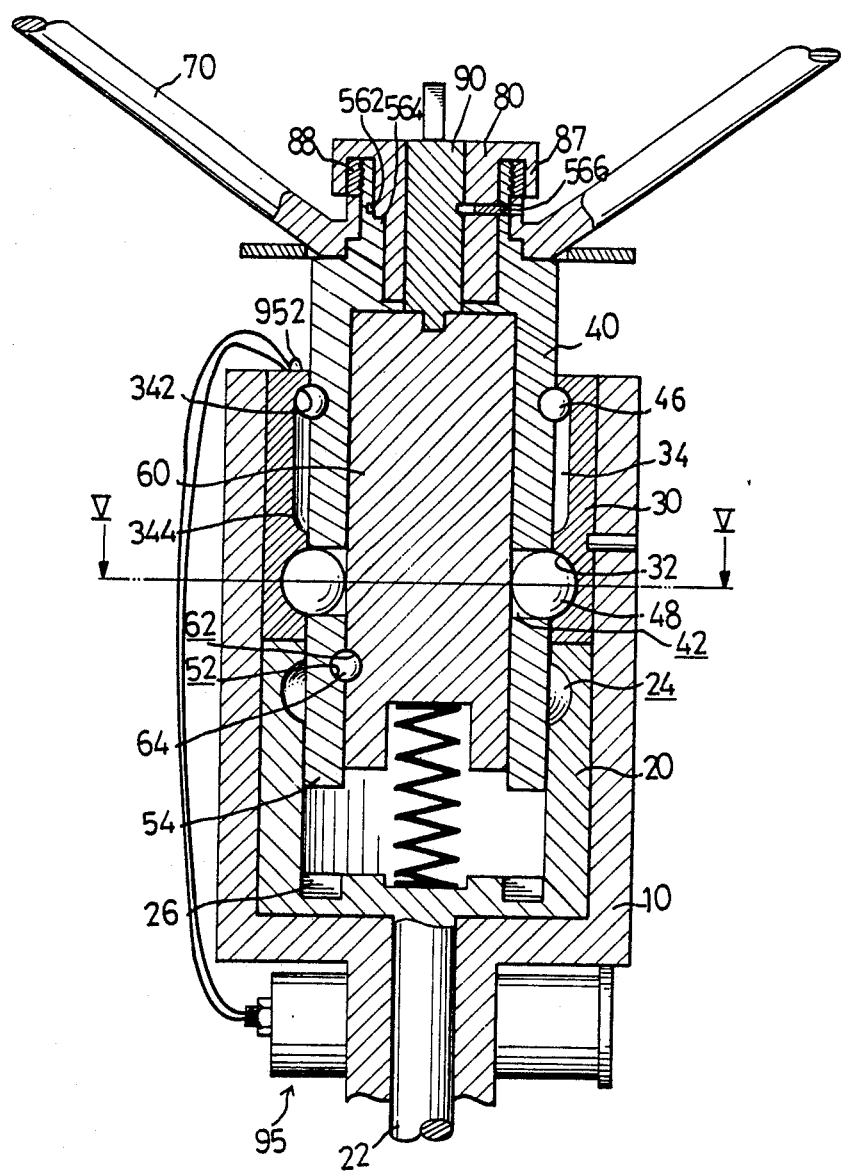
FIG. 2 is a longitudinal cross-sectional view of this invention showing the engaging block assembly thereof in an upper limit or release position, in which the steering wheel disengages the steering shaft.

Referring to the drawings, and particularly to FIGS. 1 and 2, a steering wheel releasing and engaging mechanism, according to this invention, comprises a substantially cylindrical outer housing 10 for receiving a steering shaft assembly (20 and 30 in combination) therein, an engaging block assembly (40 and 60 in combination) releasably slidable within the steering shaft assembly, a steering wheel 70 fixedly mounted on the engaging block assembly, and a lock assembly for releasing or engaging the engaging block assembly with the steering shaft assembly.

The steering shaft assembly is composed of a lower part 20 and an upper part 30. A steering shaft 22 is integrally formed on a bottom of the lower part 20. The lower part 20 is rotatably received within the outer housing 10 and has a plurality of ball guide recesses 24, ion this embodiment four are shown, formed on an inner wall thereof. The upper part 30 is fixedly secured to the outer housing 10 by a pin and hole design or the like. The upper part 30 has an annular ball guide groove 32 and a limit recess 34 formed on an inner wall thereof.

Figure 4:
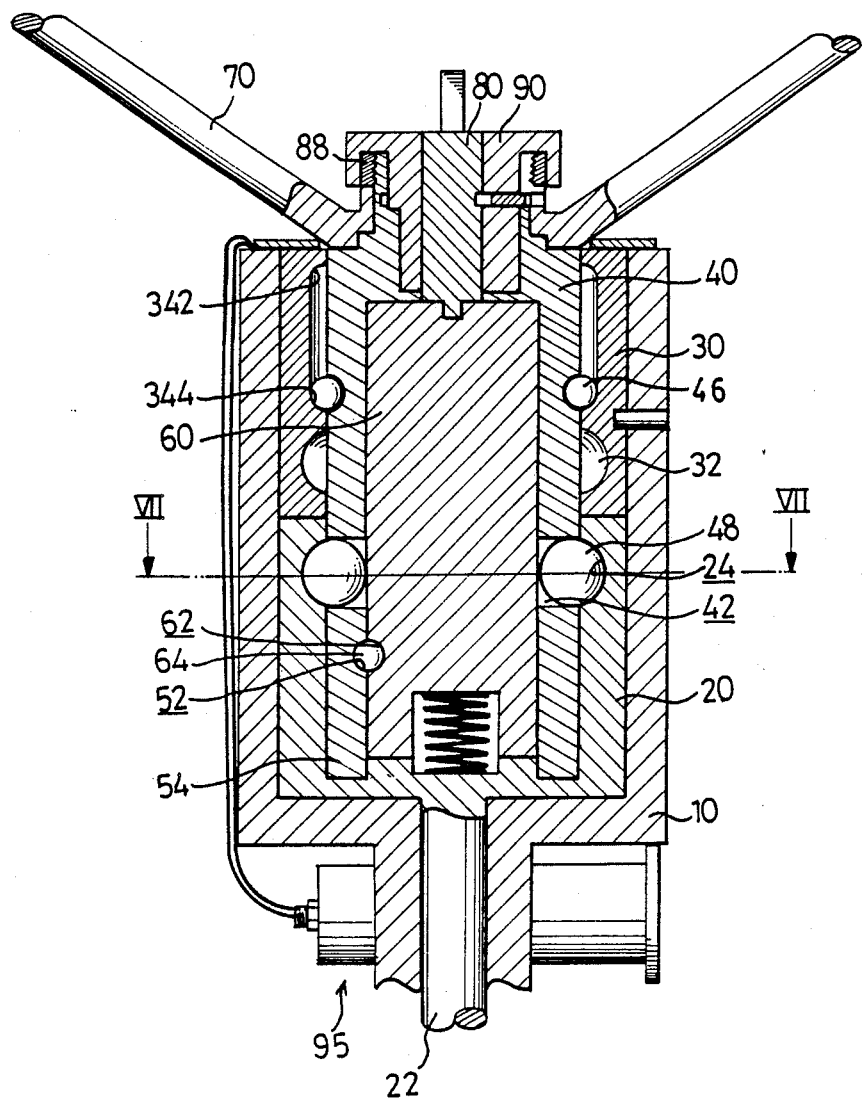
FIG. 4 is a view similar to FIG. 2 but showing the engaging block assembly in a lower limit or engage position, in which the steering wheel engages the steering shaft.

The engaging block assembly is freely rotatably and is longitudinally slidable within the steering shaft assembly between an upper limit position, shown in FIG. 2, and a lower limit position, shown in FIG. 4. The engaging block assembly comprises an engaging block 40 and an actuating block 60. The engaging block 40 has a plurality of ball guide holes 42 formed thereon and an annular groove 44 formed on an outer wall thereof. A plurality of engaging balls 48 each are disposed in respective ball guide hole 42. The engaging balls 48 are engageable with the ball guide groove 32 so that the engaging block assembly is rotatable relative to the upper part 30 of the steering shaft assembly or are engageable with said ball guide holes 24 so that the engaging block assembly can rotate the lower part 20 of the steering shaft assembly to turn, which will be further described hereinbelow. The engaging block 40 further has a ball cave 52 and the actuating block 60 further has a corresponding ball limit groove 62 angularly extending a suitable length, approximately 45 degrees. The actuating block 60 is therefore rotatable within the engaging block 40 by turning an actuating bolt 90 of the lock assembly, but is not slidable therewithin due to a limiting ball 64 being disposed between the ball limit groove 62 of the actuating block 60 and the ball cave 52 of the engaging block 40.

Figure 5:
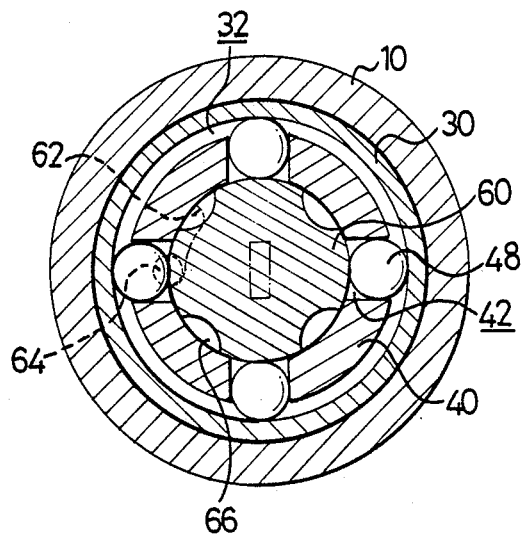
FIG. 5 is a cross-sectional view taken along line V—V in FIG. 2 showing the interrelation of the plurality of engaging balls with other elements.

The limiting ball 64 disposed between the ball cave 52 and the ball limit groove 62 confines the actuating block 60 to be rotatable between two limit positions. These two limit positions of the actuating block 60 can be understood from dotted lines shown in FIGS. 5 and 6, wherein FIG. 6 is obtained from FIG. 5 by turning the actuating block 60 of FIG. 5 approximately 45 degrees in a counterclockwise direction.

Figure 3:
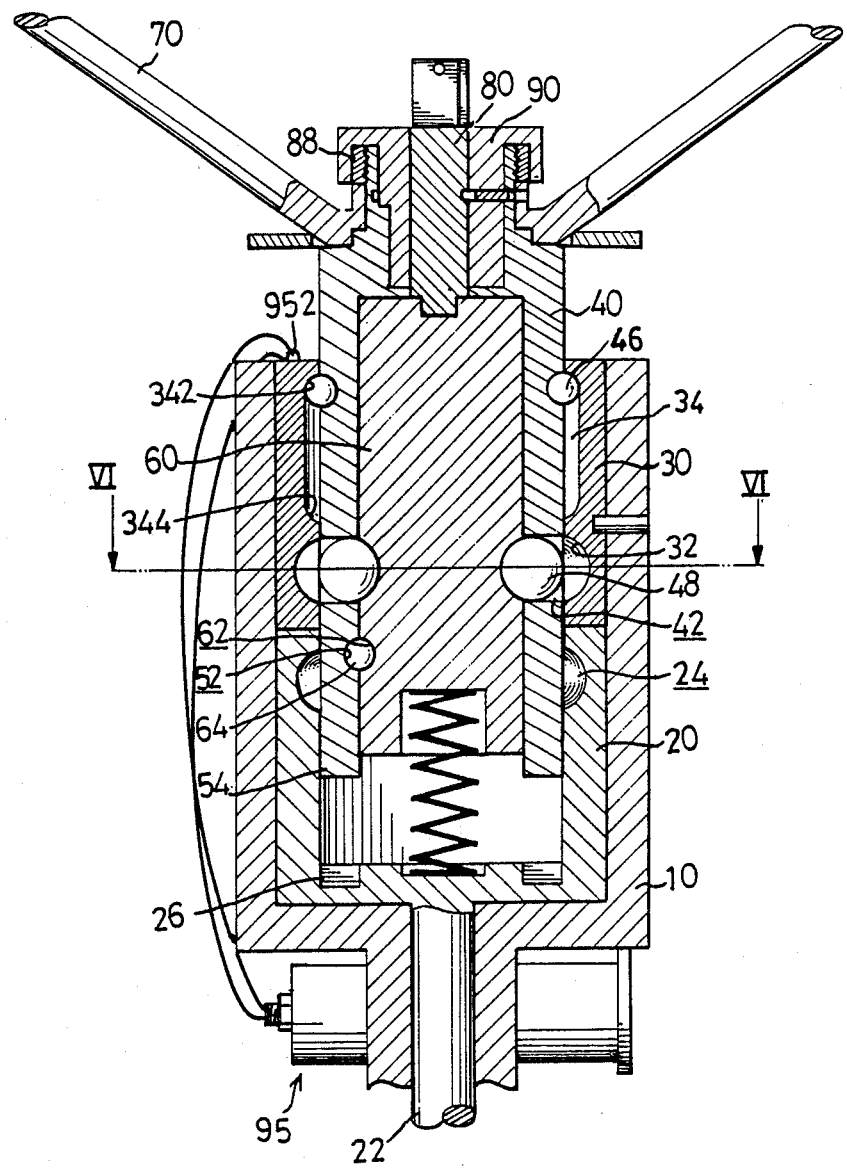
FIG. 3 is a view similar to FIG. 2 but showing the actuating block and the plurality of engaging balls in such positions that the engaging block assembly can be lowered to a lower limit or engage position.
Figure 6:
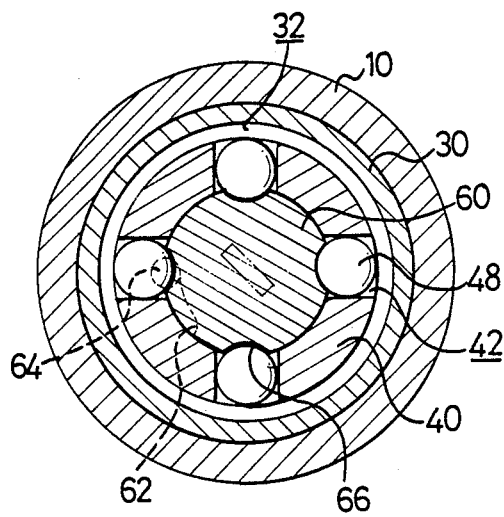
FIG. 6 is a view similar to FIG. 5 but taken along line VI—VI in FIG. 3.
Figure 7:
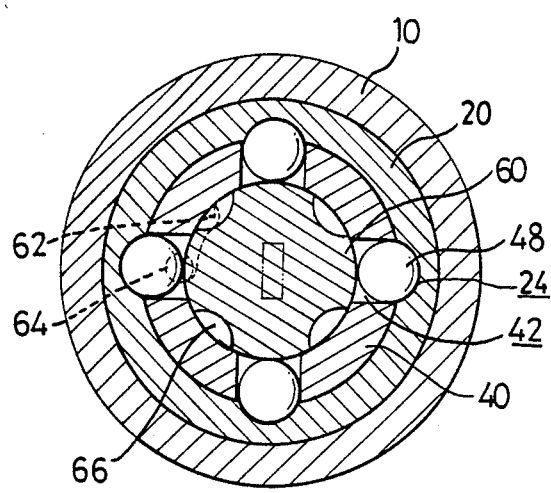
FIG. 7 is a view similar to FIG. 5 but taken along line VII—VII in FIG. 4.

Referring to FIGS. 3 and 6, which show the actuating block 60 in one of the two limit positions mentioned above. In this limit position, a plurality of receiving caves 66 formed on the actuating block 60 are aligned with the engaging balls 48 so that the engaging balls 48 can leave the ball guide groove 32 to fall into the corresponding receiving caves 66. It is noted that the ball guide groove 32, the ball guide hole 42, the receiving cave 66 and the engaging ball 48 have such sizes or dimensions that when they are aligned to each other as shown in FIG. 3, a freely longitudinal movement of the engaging block assembly relative to the steering shaft assembly or a rotational movement of the actuating block 60 relative to the engaging block 40 is ascertained. Therefore, the engaging block assembly is longitudinally movable between the above-described upper limit position and lower limit position when the actuating block 60 is in one of the two limit positions.

As can be seen from FIGS. 2 and 4, the engaging balls 48 engage with the ball guide groove 32 of the upper part 30 and the ball guide holes 24 of the lower part 20, respectively. The engaging block assembly is therefore rotatable relative to the upper part 30 of the steering assembly when the actuating block 60 is in one of the two limit positions (referring to FIG. 2) but will rotate the lower part 20 of the steering shaft assembly when the actuating block 60 is in the other limit position (referring to FIG. 4). A plurality of legs 54 protruding downward from a bottom of the engaging block 40 can be provided to cooperate with a plurality of receiving holes 26 formed on the lower part 20 so that a secure engagement between the engaging block 40 and the lower part 20 is assured.

Referring to FIGS. 1 to 3, the lock assembly is releasably secured on a top of the engaging block assembly. The lock assembly comprises a mounting housing 80 for receiving the actuating bolt 90 mentioned above. In this invention, the actuating bolt 90 has been shown to have the function of a key blade for convenience of description. Since it is sufficient to let the actuating bolt 90 have the function of rotating the actuating block 60 to achieve the two limit positions described hereinabove, it is not necessary to describe the interconnection between the mounting housing 80 and the actuating bolt 90 in detail. The engagement between the lock assembly and the engaging block assembly will be described hereinbelow.

Referring again to FIGS. 1 and 2, the mounting housing 80 has a combination of spring 82 and rocker arm 84 construction cooperating with an annular recess 562 formed on an upper portion 560 of the engaging block 40. The spring and rocker arm each have respective ends fixedly secured to the mounting housing 80. The other ends of the spring and rocker arm are interconnected so that normally the spring 82 urges the rocker arm 84 laterally into the annular recess 562. Therefore, after the mounting housing 80 is received by the engaging block 40, a longitudinal movement therebetween is prevented. Further, the mounting housing 80 has a longitudinal slot 86 cooperating with a ridge 564 formed also on the upper portion 560 of the engaging block 40 so that the mounting housing 80 is not rotatable relative to the engaging block 40 as desired. A pin hole 566 is provided on the upper portion 560 of the engaging block 40 and a corresponding pin hole 702 is provided on the steering shaft 70 so that the mounting housing 80 can be dismounted from the engaging block 40 by urging the rocker arm via the pin hole 566. A threaded end 568 is formed on the upper portion 560 of the engaging block 40 for threadedly receiving a securing ring 88 having corresponding internal threads 882. The mounting housing 80 has a substantially T-shaped cross-section with a downward cover 87 extending therefrom. The cover 87 encases the upper portion 560 and the securing ring 88 which firmly secures the steering wheel 70 to the engaging block 40.

A plurality of guiding balls 46 is disposed between the annular groove 44 of the engaging block 40 and the limit recesses 34 of the upper part 30 of the steering shaft assembly to guide the engaging block 40 moving between the upper and lower limit positions. It is noted that the limit recess 34 has such a width that when the guiding balls 46 are stopped by an upper edge 342 of the limit recess 34 the ball guide groove 32 aligns the ball guide holes 42, and when the guiding balls are stopped by a lower edge 344 of the limit recess 34 the ball guide recesses 24 align the ball guide holes 42.

As shown in FIG. 2, a known type push button operated system can be provided for controlling ON/OFF of a power switch 95 of a vehicle (not shown). The push button operated system may comprise a button or sensing device 952 disposed on the upper part 30 of the steering shaft assembly. A corresponding plate 72 can be securely mounted between the steering wheel 70 and the engaging block 40 so that when the engaging block assembly moves downward the plate 72 can contact the button or sensing device 952 to activate the power switch 95.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A steering wheel releasing and engaging mechanism comprising: a substantially cylindrical outer housing (10) for receiving a steering shaft assembly therein, an engaging block assembly releasably slidable within said steering shaft assembly, a steering wheel (70) fixedly mounted on said engaging block assembly, and a lock assembly for releasing or engaging said engaging block assembly with said steering shaft assembly; wherein;

said steering shaft assembly is composed of a lower part (20) and an upper part (30), said lower part (20) being integral to a steering shaft (22), said lower part (20) being rotatably received within said outer housing (10) and having a plurality of ball guide recesses (24) formed on an inner wall thereof, said upper part (30) being fixedly secured to said outer housing (10), said upper part (30) having an annular ball guide groove (32) and a limit recess (34) formed on an inner wall thereof;

said engaging block assembly is freely rotatable and is longitudinally slidable within said steering shaft assembly between an upper limit position and a lower limit position, said engaging block assembly comprising an engaging block (40) and an actuating block (60), said engaging block (40) having a plurality of ball guide holes (42) formed thereon and an annular groove (44) formed on an outer wall thereof, said actuating block (60) being rotatable within said engaging block (40) by said lock assembly so that said engaging block assembly is slidable between said upper limit position and said lower limit position;

said lock assembly is releasably secured on a top of said engaging block assembly, said actuating block (60) is rotatable by said lock assembly; and a plurality of guiding balls (46) are disposed between said annular groove (44) and said limit recess (34);

a plurality of engaging balls (48) each are disposed in respective ball guide hole (42), said engaging balls (48) being engageable with said ball guide groove (32) so that said engaging block assembly is rotatable relative to said upper part (30) of said steering shaft assembly, said engaging balls (48) being engageable with said ball guide holes (24) so that said engaging block assembly rotates said lower part (20) of said steering shaft assembly to turn.

2. A steering wheel releasing and engaging mechanism as claimed in claim 1, wherein said engaging block (40) further has a ball cave (52) and said actuating block (60) further has a corresponding ball limit groove (62) angularly extending a suitable length, a limiting ball (64) being disposed between the said ball cave (52) and said ball limit groove (62) so that said actuating block (60) is rotatable between a first limit position and a second limit position, said engaging block (40) being rotatable relative to said upper part (30) of said steering shaft assembly when said actuating block (60) is in said first limit position, said engaging block assembly rotating said lower part (20) of said steering shaft assembly when said actuating block (60) is in said second limit position.

* * * * *